United States Patent Office 2,798,077
Patented July 2, 1957

2,798,077

PREPARATION OF METHYL-(β-PICOLYL)-AMINE

Reinhard Schläpfer and Hans Spiegelberg, Basel, Switzerland, assignors to Hoffmann-La Roche Inc., Nutley, N. J., a corporation of New Jersey No Drawing. Application September 15, 1955,
Serial No. 534,614

Claims priority, application Switzerland
September 24, 1954

3 Claims. (Cl. 260—296)

This invention relates to a novel method for the preparation of methyl-(β-picolyl)-amine. A distinguishing feature of this method comprises catalytically hydrogenating 3-cyanopyridine in the presence of methylamine at a temperature above about 50° C. and under a hydrogen pressure above about 30 atmospheres. One comprehensive embodiment of the invention comprises catalytically hydrogenating 3-cyanopyridine in the presence of methylamine until one molar proportion of hydrogen has been taken up, reacting the partial hydrogenation product with a second molar proportion of hydrogen at a temperature above about 50° C. and at a hydrogen pressure above about 30 atmospheres, and isolating methyl-(β-picolyl)-amine.

Raney nickel is especially suitable as the hydrogenation catalyst. In order to obtain the best yields, it is also advantageous to use methylamine in stoichiometric excess, preferably in a proportion of about 7 mols per mol of 3-cyanopyridine. It is further advantageous to conduct the first stage of hydrogenation (until the absorption of 1 mol of hydrogen per mol of 3-cyanopyridine) at room temperature, then to heat the partially hydrogenated intermediate product for some time above about 50° C. (for example, one hour between 50 and 100° C. and an additional hour between 100 and 110° C.) and then, at this latter temperature range, and under a high hydrogen pressure (e. g. about 100 atmospheres) to continue the hydrogenation until the absorption of a second mol of hydrogen.

A preferred mode of executing the invention comprises reacting elemental hydrogen with 3-cyanopyridine in the presence of a molar excess of methylamine, under the influence of a Raney nickel catalyst, at a temperature below about 50° C., until cessation of hydrogenation; heating the partial hydrogenation product at a temperature between about 50° C. and about 110° C.; reacting the heated partial hydrogenation product with elemental hydrogen, under the influence of a Raney nickel hydrogenation catalyst, at a temperature above about 50° C. and at a hydrogen pressure above about 30 atmospheres, until cessation of hydrogenation; reacting the crude hydrogenation product with an approximately molar equivalent of phthalic anhydride (calculated upon the proportion of β-picolylamine in the crude product); and distilling methyl-(β-picolyl)-amine from the reaction mixture thus obtained.

An alternative method comprises conducting the hydrogenation from the beginning at a temperature above about 50° C. and at a final hydrogen pressure above about 30 atmospheres. The uptake of hydrogen in this case ceases upon the absorption of 2 mols of hydrogen per mol of 3-cyanopyridine.

The crude reaction product comprises predominantly methyl-(β-picolyl)-amine, which is contaminated with β-picolylamine. The two amines can be separated only partially by fractional distillation. The observation has been made that β-picolylamine reacts with phthalic anhydride to form β-picolylphthalamidic acid (M. P. 157–158° C.) more quickly than methyl-(β-picolyl)-amine reacts with phthalic anhydride to form methyl-β-picolylphthalamidic acid (M. P. 191° C.); moreover, upon heating methyl-(β-picolyl)-phthalamidic acid with β-picolylamine, quantitative transamidation takes place with formation of β-picolylphthalamidic acid and liberation of methyl-(β-picolyl)-amine. Upon heating, β-picolyl-phthalamidic acid splits off water as low as at 130° C. and is cyclized to β-picolyl-phthalimide (M. P. 156–157° C.). An advantageous method for working up the crude methyl-(β-picolyl)-amine obtained rests upon these relationships. The proportion of primary amine in the crude hydrogenation product obtained according to the invention is determined according to the method of Van Slyke. Thereupon, the crude reaction product is mixed with a quantity of phthalic anhydride equivalent to the proportion of β-picolylamine thus determined (1 mol of phthalic anhydride per mol of β-picolylamine). At a temperature below about 100° C., formation of β-picolyl-phthalamidic acid takes place preferentially, together with the formation of a little methyl-(β-picolyl)-phthalamidic acid. Upon heating the mixture above about 130° C., methyl-(β-picolyl)-phthalamidic acid reacts with the free β-picolylamine, with reformation of methyl-(β-picolyl)-amine and the formation of a further quantity of β-picolyl-phthalamidic acid. The latter, at the reaction temperature obtaining, immediately loses water and is thereby cyclized to form β-picolyl-phthalimide. It is advantageous to continuously remove the water of reaction from the reaction mixture by azeotropic distillation with the aid of a hydrophobic entraining agent, for example xylene. At the conclusion of the reaction (cessation of liberation of water), methyl-(β-picolyl)-amine can be separated from the difficultly volatile β-picolyl-phthalimide by vacuum distillation of the reaction mixture, and can thus be isolated in a high degree of purity. An alternative method for isolation of methyl-(β-picolyl)-amine comprises separating the major proportion of the β-picolyl-phthalimide in crystalline form by cooling the reaction mixture, filtering off the crystalline precipitate, washing the latter with methanol, and fractionally distilling the combined washings and mother liquor.

Example 1

104 g. of 3-cyanopyridine was mixed with a solution of 217 g. of anhydrous methylamine in 360 ml. of absolute methanol and the reaction mixture was hydrogenated in a stirring autoclave at room temperature under a hydrogen pressure of 100 atmospheres and in the presence of 12 g. of anhydrous Raney nickel. Upon absorption of the calculated quantity of hydrogen—1 mol of hydrogen per mol of 3-cyanopyridine—the hydrogenation came to a stop. The agitation of the reaction mixture was interrupted and the mixture containing the partial hydrogenation product was heated at 100° C. for 1½ hours. Agitation was then again instituted and hydrogenation was continued at 100° C. and at a hydrogen pressure of 100 atmospheres, an additional mol of hydrogen being quickly taken up. (The total consumption of hydrogen for both stages of the hydrogenation amounted to 2 mols of hydrogen per mol of 3-cyanopyridine.) The catalyst was filtered off, and the solvent was distilled off. In order to separate the β-picolylamine formed as a by-product, the proportion of primary amine in the crude product was determined according to the Van Slyke method; and the crude hydrogenation mixture, after addition of 1.4 g. of phthalic anhydride per gram of β-picolylamine thus determined, was heated together with about 80 ml. of xylene in order to separate off water. When the separation of water had ceased, the xylene was driven off and the residue was fractionally distilled. Methyl-(β-picolyl)-amine distilled at 99° C./11 mm. The distillation residue contained β-picolyl-phthalimide.

Example 2

104 g. of 3-cyanopyridine was mixed with a solution of 217 g. of anhydrous methylamine in 360 ml. of absolute methanol and the reaction mixture was hydrogenated in a shaking autoclave at room temperature under a hydrogen pressure of 150 atmospheres and in the presence of 12 g. of anhydrous Raney nickel. Upon absorption of 1 mol of hydrogen per mol of 3-cyanopyridine, the hydrogenation came to a stop. The agitation of the reaction mixture was interrupted and the mixture containing the partial hydrogenation product was heated at 50° C. for 2 hours. The reaction mixture was heated to 100° C., and the hydrogenation was continued, with shaking, at 100° C. and at a hydrogen pressure of 100 atmospheres. The total consumption of hydrogen for both stages of the hydrogenation amounted to 2 mols of hydrogen per mol of 3-cyanopyridine. The catalyst was filtered off, and the solvent was distilled off. The proportion of primary amine in the crude product was determined according to the Van Slyke method. After addition to the crude hydrogenation mixture of 1.4 g. of phthalic anhydride per gram of β-picolylamine, the mixture was heated together with about 80 ml. of xylene, an azeotrope of water-xylene being thereby distilled. When the separation of water had ceased, the remaining xylene was driven off and the residue was fractionally distilled. Methyl-(β-picolyl)-amine distilled at 99° C./11 mm.

We claim:

1. A process for the preparation of methyl-(β-picolyl)-amine which comprises catalytically hydrogenating 3-cyanopyridine in the presence of methylamine until one molar proportion of hydrogen has been taken up, and catalytically hydrogenating the partial hydrogenation product at a temperature above about 50° C. and at a hydrogen pressure above about 30 atmospheres until an additional molar proportion of hydrogen has been taken up.

2. A process for the preparation of methyl-(β-picolyl)-amine which comprises reacting elemental hydrogen with 3-cyanopyridine in the presence of a molar excess of methylamine, under the influence of a Raney nickel catalyst, at a temperature below about 50° C., until cessation of hydrogenation; heating the partial hydrogenation product at a temperature between about 50° C. and about 110° C.; reacting the heated partial hydrogenation product with elemental hydrogen, under the influence of a Raney nickel hydrogenation catalyst, at a temperature above about 50° C. and at a hydrogen pressure above about 30 atmospheres, until cessation of hydrogenation.

3. A process for the preparation of methyl-(β-picolyl)-amine which comprises reacting elemental hydrogen with 3-cyanopyridine in the presence of a molar excess of methylamine, under the influence of a Raney nickel catalyst, at a temperature below about 50° C., until cessation of hydrogenation; heating the partial hydrogenation product at a temperature between about 50° C. and about 110° C.; reacting the heated partial hydrogenation product with elemental hydrogen, under the influence of a Raney nickel hydrogenation catalyst, at a temperature above about 50° C. and at a hydrogen pressure above about 30 atmospheres, until cessation of hydrogenation; reacting the crude hydrogenation product with an approximately molar equivalent of phthalic anhydride (calculated upon the proportion of β-picolyl amine in the crude product); and distilling methyl-(β-picolyl)-amine from the reaction mixture thus obtained.

References Cited in the file of this patent

UNITED STATES PATENTS

| | | |
|---|---|---|
| 2,310,167 | Carlson | Feb. 2, 1943 |
| 2,349,318 | Westphal | May 23, 1944 |
| 2,388,034 | Biggs | Oct. 30, 1945 |

OTHER REFERENCES

Adkins: "Reactions of Hydrogen" (U. of Wis.), pp. 54–55 (1946).